Nov. 8, 1927. 1,648,729
P. E. HAWKINSON
TIRE PATCH WITH APPLICATION INDICATOR
Filed Jan. 7, 1927
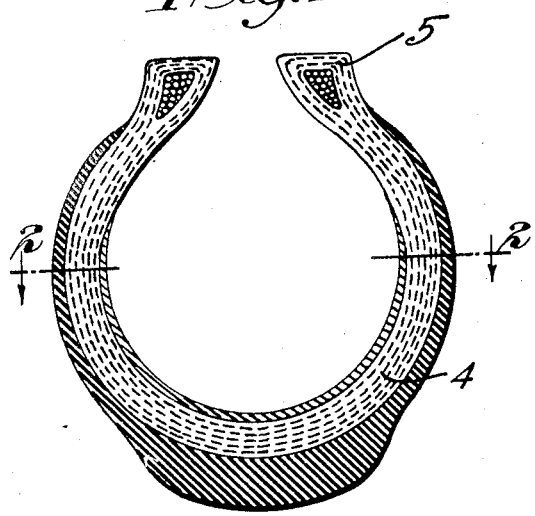
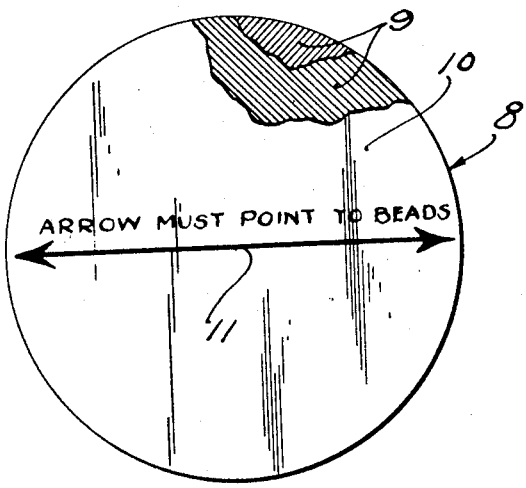
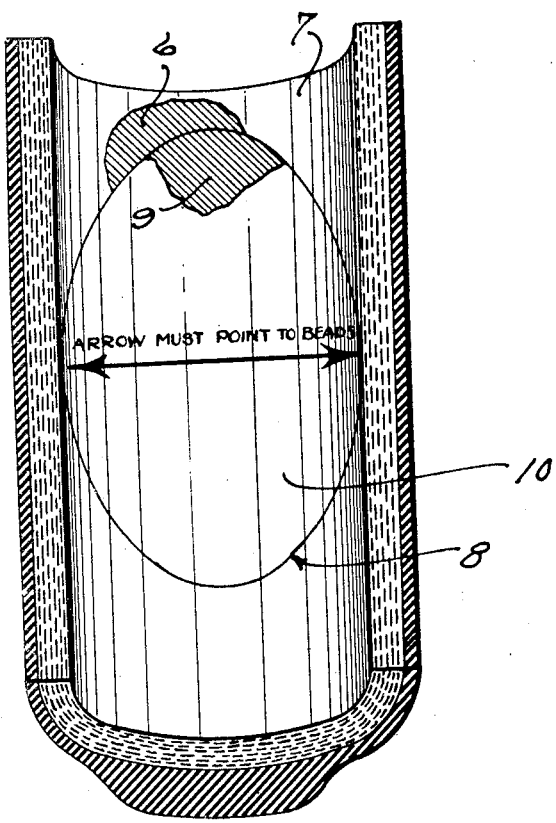
Inventor
Paul E. Hawkinson
By his Attorneys Patented Nov. 8, 1927.

1,648,729

UNITED STATES PATENT OFFICE.

PAUL E. HAWKINSON, OF MINNEAPOLIS, MINNESOTA, ASSIGNOR TO KE HAW KE MANUFACTURING COMPANY, A CORPORATION OF MINNESOTA.

TIRE PATCH WITH APPLICATION INDICATOR.

Application filed January 7, 1927. Serial No. 159,561.

My present invention has for its object to provide a tire casing patch with indicating means by which it may be positioned in a casing with a definite and predetermined relation thereto before cementing the same in position.

As is well known, cord tire casings have considerable elasticity both transversely and circumferentially during flexing action but are non-elastic lengthwise of their cords. In applying a multiple ply cord patch to such a casing it is highly important that its cords run in the same direction as the cords in the casing in order that the patch, when cemented in position, will have the same action as an inflated casing during flexing movement thereof. Or in other words, the patch will transversely and circumferentially contract and expend in unison with the inflated casing when cemented thereto. If a patch is not properly positioned in a casing so as to have the same contraction and expansion therewith when flexing, a chafing action is set up with the result that the casing soon pulls itself loose from the patch and thereby renders the patch useless.

Patches usually have a protecting sheet or covering applied to their inner plies so that the cords thereof are not visible, and the inner ply of a casing is usually coated with soapstone or other substances so that at the time a patch is applied thereto it is practically impossible to see its cords so as to position a patch in the casing with its inner layer or ply of cords running in the same direction as the cords of the adjacent inner layer or ply of the casing.

By the use of my invention a patch may be very quickly and accurately positioned in a casing without referring to the cords in either said patch or casing, and when semented in position, its inner layer or ply of cords run in the same direction as the inner layer or ply of cords in the casing and the inner layer or ply of said patch will have the same elasticity as the respective portion of the casing during flexing action.

In the accompanying drawings, which illustrate the invention, like characters indicate like parts throughout the several views.

Referring to the drawings:

Fig. 1 is a transverse section of a cord tire casing having a patch cemented to its inner ply;

Fig. 2 is a view partly in section taken on the line 2—2 of Fig. 1 and showing in plan the patch with the indicating means shown, some parts of the casing and patch being broken away; and Fig. 3 is a plan view of the patch with some parts broken away.

The numeral 4 indicates a cord tire casing as an entirety with the exception of its bead 5, cords 6 of its inner ply, and covering 7 for said inner ply. Cemented in the casing 4 is a multiple ply patch 8, the cords of its inner and adjacent ply are indicated by the numeral 9, and a protecting sheet 10 of suitable material is applied to the inner ply of the patch 8. By reference to Fig. 2 is will be noted that the cords of the inner ply of the patch 8 are aligned with the cords of the inner ply of the casing 4. The term "cord" is herein used in a broad sense to cover threads or similar material from which tires or patches are made.

The invention, as shown, is in the form of a double-headed arrow 11 printed or otherwise marked on the inner face of the patch 8, extending transversely thereof and pointing to the beads 5 of the casing 4. The words "Arrows must point to beads" are also printed on the shaft of the arrow. Obviously, by placing the patch 8 in the casing 4 with the arrow pointing to the beads 5 of said casing the cords 9 of the inner ply of the patch 8 will be aligned with the cords 6 of the inner ply of said casing.

In place of a double-headed arrow the patch may have other indicating means by which it can be properly placed in a casing.

What I claim is:

1. An internal tire patch for cord tires having an inner layer or ply of cord material the cords of which being disposed in the same relation as the cords composing the inner layer of the tire, said patch having applied to its upper visible surface a permanent marking having a definite relation to the direction in which the cords of the inner layer or ply of the patch are disclosed, said marking serving to direct the manner of application of said patch to said tire to cause the adjacent cords of the patch and tire materials to extend in parallelism and thereby providing uniform contraction and expansion of the patch and tire material during flexing.

2. The combination with a cord tire having an inner layer or ply of cords disposed in parallel relationship, a patch adapted to be united to the inner layer of said tire and having an inner layer or ply of cords disposed in the same relation as the cords composing the adjacent inner layer of the tire, whereby the adjacent cords of the patch and tire materials extend in parallelism and permit uniform contraction and expansion of the patch and tire material during flexing.

In testimony whereof I affix my signature.

PAUL E. HAWKINSON.